Figure 1:
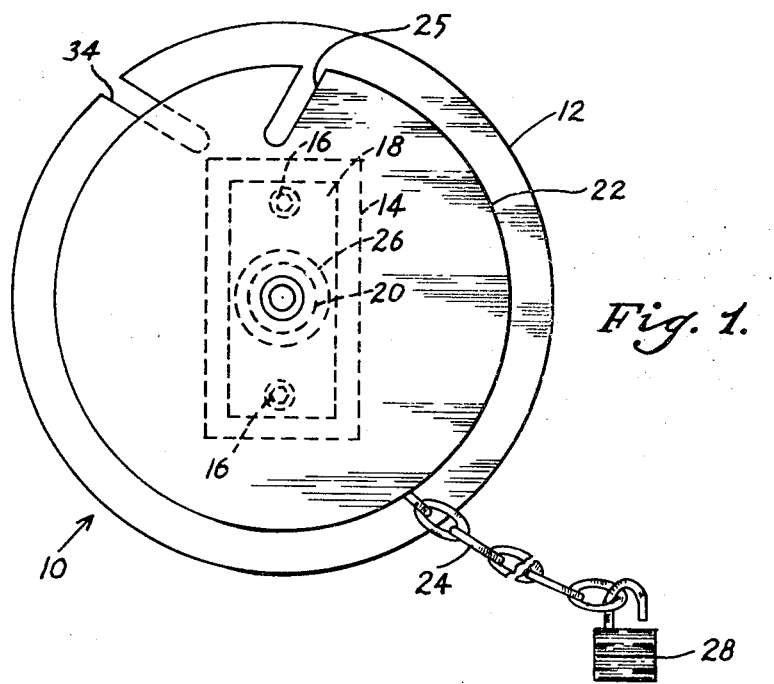

United States Patent [19]
Portus

[11] 3,756,048
[45] Sept. 4, 1973

[54] THEFT-PROOF TETHER
[76] Inventor: Robert A. Portus, 127 Ferry Rd., Grants Pass, Oreg. 97526
[22] Filed: Mar. 15, 1972
[21] Appl. No.: 234,910

[52] U.S. Cl.............. 70/233, 70/58, 206/19.5 R, 242/85.1, 242/106, 248/203
[51] Int. Cl.................. E05b 71/00, B62h 5/00
[58] Field of Search ............... 70/20, 30, 49, 51, 70/52, 58, 61, 62, 233, 234; 248/203; 206/19.5 R, 19.5 B, 46 H, 59 B; 242/85.1, 106; 280/289

[56] References Cited
UNITED STATES PATENTS
| | | | |
|---|---|---|---|
| 1,408,261 | 2/1922 | Brookhart | 242/85.1 |
| 2,451,100 | 10/1948 | Lecompte | 70/49 UX |
| 2,587,707 | 3/1952 | Dever | 242/85.1 |
| 2,933,915 | 4/1960 | Gossner | 70/49 |

FOREIGN PATENTS OR APPLICATIONS
| | | | |
|---|---|---|---|
| 132,445 | 7/1902 | Germany | 70/233 |
| 880,789 | 6/1953 | Germany | 70/49 |

*Primary Examiner*—Werner H. Schroeder
*Attorney*—Clarence M. Crews

[57] ABSTRACT

A theft-proof tether of substantial length is provided for vehicles such as motorcycles or other movable objects. The tether desirably comprises a spool permanently affixed to the protected object, a chain inseparably connected at one end to, and normally wound on, the spool, a padlock secured on the free end of the chain, and a cover cooperative with the spool to form a weather-protective housing for the wound-on chain and the chain connected padlock. The protected object may be tethered to a fixed anchorage located almost as far from the object as the full length of the chain.

6 Claims, 2 Drawing Figures

PATENTED SEP 4 1973

3,756,048

THEFT-PROOF TETHER

This invention relates to theft-protective tethers for motorcycles and other movable objects.

It is an object of the invention to provide a link chain of considerable length and bulk permanently anchored at one end to the core member of a spool on which the chain may be wound. The chain carries on its free end a padlock. The spool desirably comprises an anchor plate which is permanently affixed to the frame of a motorcycle, or other object whose protection is sought. A cover is combined with the shaft and with an anchor plate which forms one terminus of the spool, to house, and to protect against the weather, the chain, the lock and the remainder of the spool.

Figure 2:
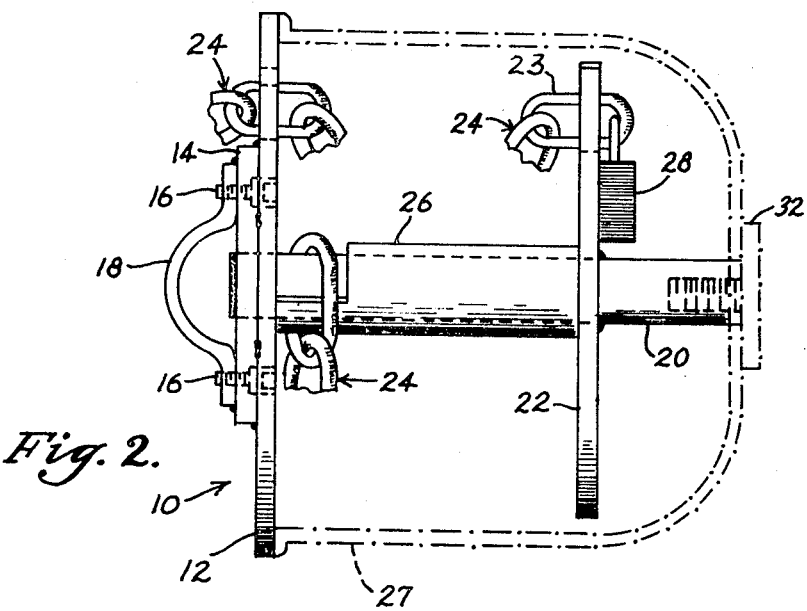

In the drawing forming part of this specification,

FIG. 1 is a view in front elevation of a practical and advantageous theft-proof tether device embodying features of the invention, the chain being broken away intermediate its ends for compactness of illustration and the cover being omitted; and FIG. 2 is a side view of the same device with most of the chain omitted for clarity and with the cover shown in dot-and-dash lines.

The illustrative device can be put to many uses. It was primarily contrived, however, for mounting on a motorcycle as a means for locking the motorcycle to a fixed object. It will be illustratively described and explained from that point of view. It could, however, be permanently attached to a fixed anchorage and detachably locked to an airplane.

The device 10 comprises an inner circular plate 12 to which a thick inner rectangular steel plate 14 is welded. Screws 16 of the Allen type (having hexagonal recesses in their heads) have their shanks passed inward through the circular plate 12 and the reinforcing heavy plate 14, and are screwed into the opposite ends of a rigid, bent, clamping plate 18. The clamping plate 18 is designed to fit partway around a bar of the motorcycle, in a position which makes the clamping plate and the associated screws inaccessible to a would-be thief.

The Allen type screws 16 desirably have the recesses in their heads filled with epoxy resin to interfere with the use of an Allen wrench for withdrawing the screws.

A malleable shaft 20 is fixedly secured, as by welding, to the inner reinforcing plate 14. The shaft extends outward from the inner plate 12 and has permanently secured upon it, as by welding, an outer plate 22.

Between the plates 12 and 22, the shaft 20 is surrounded by a case-hardened sleeve 26 which is rotatable on the shaft and is cut away sufficiently at its inner end to permit the innermost link of a case-hardened chain 24 to surround the shaft and the cut-down end of the sleeve.

In normal, idle condition, the outermost link 23 of the chain 24 is lodged in a marginal slot 25 of the outer plate 26, and the space between a weather-protective cover 27 and the outer plate receives the keeper member of the padlock 28 in either a locked or unlocked condition, so that the body of the padlock is held in a definite position against the outer face of the outer plate 22. The fact that the sleeve is rotatable on the shaft enables the end link of the chain to be located as described.

The dome-like cover 27 is placed over the lock, the outer plate, and the wound-on chain. The cover has a central opening which may be aligned with an internally threaded bore portion of the shaft 20, so that the cover may be maintained firmly pressed by a headed screw 32, in a water-tight manner against the inner plate 12. The chain and lock are thus protected against weather damage.

With the device inseparably secured to the motorcycle or other structure which it is desired to protect against theft, the cover may be manually removed, the chain may be unwound, an inner link may be lodged in a slot 34 of the inner plate 12, and the free chain end may be looped about a fixed anchorage, and locked to any chain link desired. A 6 foot chain may provide substantially a 6 foot theft-proof tether. The cover 27 and screw 32 are then reapplied, with the cover again bearing evenly and firmly against the inner plate 12.

The device can be used to lock several motorcycles to one another and to a suitable anchorage, if desired.

I have described what I believe to be the best embodiments of my invention. What I desire to cover by letters patent is set forth in the appended claims.

I claim:

1. A theft-proof tether device comprising, in combination,
   a. a base plate together with means for securely and inseparably anchoring the base plate to a fixed anchorage or to an object to be tethered,
   b. an outstanding shaft rigidly secured to the base plate,
   c. a tether chain connected at one end to the shaft and adapted to be wound around the shaft for storage,
   d. a second plate fixed on the shaft at a substantial distance outward from the base plate for bounding the space in which the chain may be wound around the shaft, the second plate being spaced inward a substantial distance from the end of the shaft,
   e. a lock carried by the end of the chain remote from the shaft-connected end and adapted to be interlocked also with any selected link of the chain,
   f. a weather-protective housing cover adapted to fit snugly against the base plate for protecting the chain, lock, shaft, etc. against the weather, and
   g. means for removably securing the cover in fixed position to the free end of the shaft.

2. A theft-proof tether device as set forth in claim 1 in which a reinforcing plate and an anchoring strap are secured to the inner side of the base plate by headed, anchoring Allen screws whose shanks are passed inward through the base plate and the anchoring plate and whose head cavities are plugged by a hard-setting material.

3. A theft-proof tether device as set forth in claim 1 in which the base plate is formed marginally with a slot in which a link of the extended chain may be lodged, within the peripheral bounds of the cover, whereby the cover may be secured in its normal position when the chain is unwrapped and extended for tethering purposes.

4. A theft-proof tether device as set forth in claim 1 in which the shaft extends far enough beyond the second plate to provide a space between the second plate and the cover in which the padlock may be lodged, and in which the second plate is formed with a marginal slot in which an outer link of the chain may be passed in non-interfering relation to the cover, so that the padlock may be housed in an outer chamber defined outside the outer plate and within the applied cover.

5. A theft-proof tether device as set forth in claim 4 in which a case-hardened sleeve surrounds the shaft with freedom for rotation relative to the shaft, and extends substantially from the base plate to the outer plate, said sleeve having its inner end cut away adjacent the base plate to such an extent that the cut-away portion and the shaft may be received in the innermost link of the chain, the construction and arrangement being such that the wound-on chain may be rotated with the sleeve into position to enable the outermost chain link to be lodged in the slot of the outer plate, for locating the lock at the outer side of the outer plate but within the cover.

6. A theft-proof tether device as set forth in claim 1 in which the chain links are all composed of case-hardened steel.

* * * * *